(12) United States Patent
Wells

(10) Patent No.: US 11,644,058 B2
(45) Date of Patent: May 9, 2023

(54) CLAM SHELL INSERT UTILITY

(71) Applicant: The Young Engineers, Inc., Lake Forest, CA (US)

(72) Inventor: Patrick W. Wells, Irvine, CA (US)

(73) Assignee: THE YOUNG ENGINEERS, INC., Lake Forest, CA (US)

(*) Notice: Subject to any disclaimer, the term of this patent is extended or adjusted under 35 U.S.C. 154(b) by 342 days.

(21) Appl. No.: 15/929,617

(22) Filed: May 13, 2020

(65) Prior Publication Data

US 2021/0355983 A1 Nov. 18, 2021

(51) Int. Cl.
*F16B 37/04* (2006.01)
*F16B 5/01* (2006.01)
*F16B 37/06* (2006.01)

(52) U.S. Cl.
CPC .............. *F16B 37/044* (2013.01); *F16B 5/01* (2013.01); *F16B 37/043* (2013.01); *F16B 37/061* (2013.01)

(58) Field of Classification Search
CPC ........ F16B 37/044; F16B 5/01; F16B 37/043; F16B 37/061
See application file for complete search history.

(56) References Cited

U.S. PATENT DOCUMENTS

| | | |
|---|---|---|
| 2,235,078 A | 3/1941 | Meisterhans |
| 2,764,886 A | 10/1956 | Wiesmann |
| 3,019,865 A | 2/1962 | Rohe |
| 3,213,914 A | 10/1965 | Baumle et al. |
| 3,313,078 A | 4/1967 | Rohe |
| 3,339,609 A | 9/1967 | Cushman |
| 3,493,025 A | 2/1970 | La Londe et al. |
| 3,504,723 A | 4/1970 | Cushman et al. |
| D218,674 S | 9/1970 | Ernest |
| 3,621,557 A | 11/1971 | Cushman et al. |
| 3,646,981 A | 3/1972 | Barnes |
| 3,646,982 A | 3/1972 | Cushman |
| 3,662,805 A | 5/1972 | Sygnator |
| 3,695,324 A | 10/1972 | Gulistan |
| 3,964,531 A | 6/1976 | Schenk |
| 4,121,963 A | 10/1978 | Yardley et al. |
| 4,185,438 A | 1/1980 | Fischer |
| 4,227,561 A | 10/1980 | Molina |
| 4,341,053 A | 7/1982 | Dettfurth et al. |
| 4,417,028 A | 11/1983 | Azevedo |
| 4,428,705 A | 1/1984 | Gelhard |
| D278,594 S | 4/1985 | Lye |
| 4,509,308 A | 4/1985 | Dettfurth et al. |
| 4,752,171 A | 6/1988 | Pliml, Jr. |
| 4,812,193 A | 3/1989 | Gauron |
| 4,817,264 A | 4/1989 | Worthing |
| 4,846,612 A | 7/1989 | Worthing |
| 4,902,180 A | 2/1990 | Gauron |
| 4,973,208 A | 11/1990 | Gauron |

(Continued)

*Primary Examiner* — David M Upchurch
(74) *Attorney, Agent, or Firm* — Norton Rose Fulbright US LLP

(57) ABSTRACT

A honeycomb sandwich panel insert includes a housing defined by two identical halves which when joined together form a distal flange having opposed potting holes, and a central internal bore, integrally formed laterally extending member when joined forms a tight closed distal end of said bore. The honeycomb sandwich panel insert further includes a nut disposed within the internal bore of the housing and configured to float therein.

20 Claims, 5 Drawing Sheets

(56) References Cited

U.S. PATENT DOCUMENTS

| | | |
|---|---|---|
| 4,993,902 A | 2/1991 | Hellon |
| D322,929 S | 1/1992 | Abbestam et al. |
| 5,082,405 A | 1/1992 | Witten |
| 5,092,725 A | 3/1992 | Aittama |
| 5,240,543 A | 8/1993 | Fetterhoff et al. |
| 5,302,069 A | 4/1994 | Toth et al. |
| 5,378,099 A | 1/1995 | Gauron |
| 5,431,578 A | 7/1995 | Wayne |
| 5,437,750 A | 8/1995 | Rinse et al. |
| D364,882 S | 12/1995 | Junkers |
| 5,553,984 A | 9/1996 | Smith |
| 5,622,208 A | 4/1997 | Vinson |
| 5,632,582 A | 5/1997 | Gauron |
| 5,840,147 A | 11/1998 | Grimm |
| 5,840,149 A | 11/1998 | Tokunaga et al. |
| 5,843,265 A | 12/1998 | Grimm |
| 5,947,518 A | 9/1999 | Redman et al. |
| 6,096,256 A | 8/2000 | Aretz |
| 6,146,071 A | 11/2000 | Norkus et al. |
| 6,153,035 A | 11/2000 | Van Laeken |
| 6,217,695 B1 | 4/2001 | Goldberg et al. |
| 6,264,412 B1 | 7/2001 | Nakamura et al. |
| 6,273,985 B1 | 8/2001 | DeLouise et al. |
| 6,278,562 B1 | 8/2001 | Lovett |
| 6,299,596 B1 | 10/2001 | Ding |
| D452,428 S | 12/2001 | Shinjo et al. |
| D453,000 S | 1/2002 | Shinjo et al. |
| 6,350,093 B1 | 2/2002 | Petersen et al. |
| D454,057 S | 3/2002 | Pamer et al. |
| D457,054 S | 5/2002 | Pamer et al. |
| 6,485,130 B2 | 11/2002 | DeLouise et al. |
| 6,488,460 B1 | 12/2002 | Smith et al. |
| 6,692,206 B1 | 2/2004 | Clinch et al. |
| 6,733,221 B2 | 5/2004 | Linger |
| 6,758,645 B2 | 7/2004 | Curley, Jr. et al. |
| D499,010 S | 11/2004 | Velten |
| 6,811,363 B1 | 11/2004 | Minnich |
| D519,530 S | 4/2006 | Thysell et al. |
| D520,856 S | 5/2006 | Osiecki et al. |
| D520,859 S | 5/2006 | Osiecki et al. |
| 7,134,821 B2 | 11/2006 | Clinch et al. |
| D534,796 S | 1/2007 | Falkenburg |
| 7,192,231 B2 | 3/2007 | Blackaby |
| D545,584 S | 7/2007 | Hunziker |
| D549,091 S | 8/2007 | McIntyre et al. |
| D551,269 S | 9/2007 | Burke, III |
| D557,132 S | 12/2007 | Shinjo |
| D572,302 S | 7/2008 | Peavey |
| D604,611 S | 11/2009 | Ames et al. |
| D634,343 S | 3/2011 | Burke, III |
| 8,029,221 B2 | 10/2011 | Curley, Jr. et al. |
| D662,869 S | 7/2012 | Ballard |
| D668,919 S | 10/2012 | Teng |
| D684,455 S | 6/2013 | Relyea et al. |
| D690,581 S | 10/2013 | Brander |
| D693,669 S | 11/2013 | Kousens et al. |
| D703,524 S | 4/2014 | Sakoda |
| D704,044 S | 5/2014 | Makino |
| 9,003,662 B2 | 4/2015 | Burd et al. |
| 9,109,615 B2 | 8/2015 | Cuddy et al. |
| 9,234,536 B2 | 1/2016 | Truong et al. |
| 9,702,394 B2 | 7/2017 | Barney et al. |
| 9,822,808 B2 | 11/2017 | Rajeev |
| 10,113,579 B2 * | 10/2018 | Balderrama .......... F16B 31/021 |
| 2004/0005205 A1 | 1/2004 | Yake et al. |
| 2005/0169727 A1 | 8/2005 | Cosenza |
| 2008/0292425 A1 * | 11/2008 | Pineiros ................ F16B 37/044 411/92 |
| 2016/0186796 A1 | 6/2016 | Verdier |
| 2017/0167523 A1 | 6/2017 | Davis |
| 2017/0268560 A1 | 9/2017 | Barney et al. |
| 2018/0038399 A1 | 2/2018 | Fischer et al. |

\* cited by examiner

CLAM SHELL INSERT UTILITY

BACKGROUND OF INVENTION

The interior of commercial passenger aircraft typically includes honeycomb core panels. Various devices and fixtures are attached to the honeycomb panel. In order to secure such attachments to the honeycomb core, fastener panel inserts are potted into an opening formed in the honeycomb panel using a potting material. The fastener insert has a hollow shaft, the bore of which contains female threads which are adapted to engage a male threaded screw fastener. Because it can be difficult to align the screw with the female threads, fastener inserts have been developed which are often provided with a floating nut containing the female threads which is introduced into the open or distal end of the housing of the fastener insert. The end is then capped off to prevent the flow of potting material into the female threaded portion.

Examples of known panel inserts having floating nuts are disclosed in U.S. Pat. Nos. 4,973,208, 5,632,582, 7,195,436 and U.S. Pat. App. Pub. No. 2018/0038399 A1.

The present invention affords a floating sandwich panel insert which does not involve assembly through the distal end of the housing and the use of a separate end cap. This is accomplished by a clam-shell like housing formed of two identical halves and provided with engaging elements which can be snapped together around the floating nut.

BRIEF SUMMARY OF THE INVENTION

The present invention relates to a honeycomb sandwich panel insert comprising a housing defined by two identical halves which when joined together form a distal flange having opposed potting holes, and a central internal bore, integrally formed laterally extending member when joined forms a tight closed distal end of said bore, a nut disposed within the internal bore of the housing and configured to float therein, the nut defining a truncated flange and a hollow shaft extending from the truncated flange, the hollow shaft defining internal female threads adapted to receive a male threaded screw, the truncated flange being received at the closed distal end of said bore to prevent rotation of said nut in said bore, each of said halves having an abutting surface, at least one lateral peg projecting from said abutting surface and at least one hole in said abutting surface, said peg and hole being positioned whereby when said halves are joined, a peg in one half is received in a hole in the other half by a snap fit.

BRIEF DESCRIPTION OF THE DRAWINGS

Turning to the drawings.

DETAILED DESCRIPTION OF THE PREFERRED EMBODIMENTS

Figure 1:
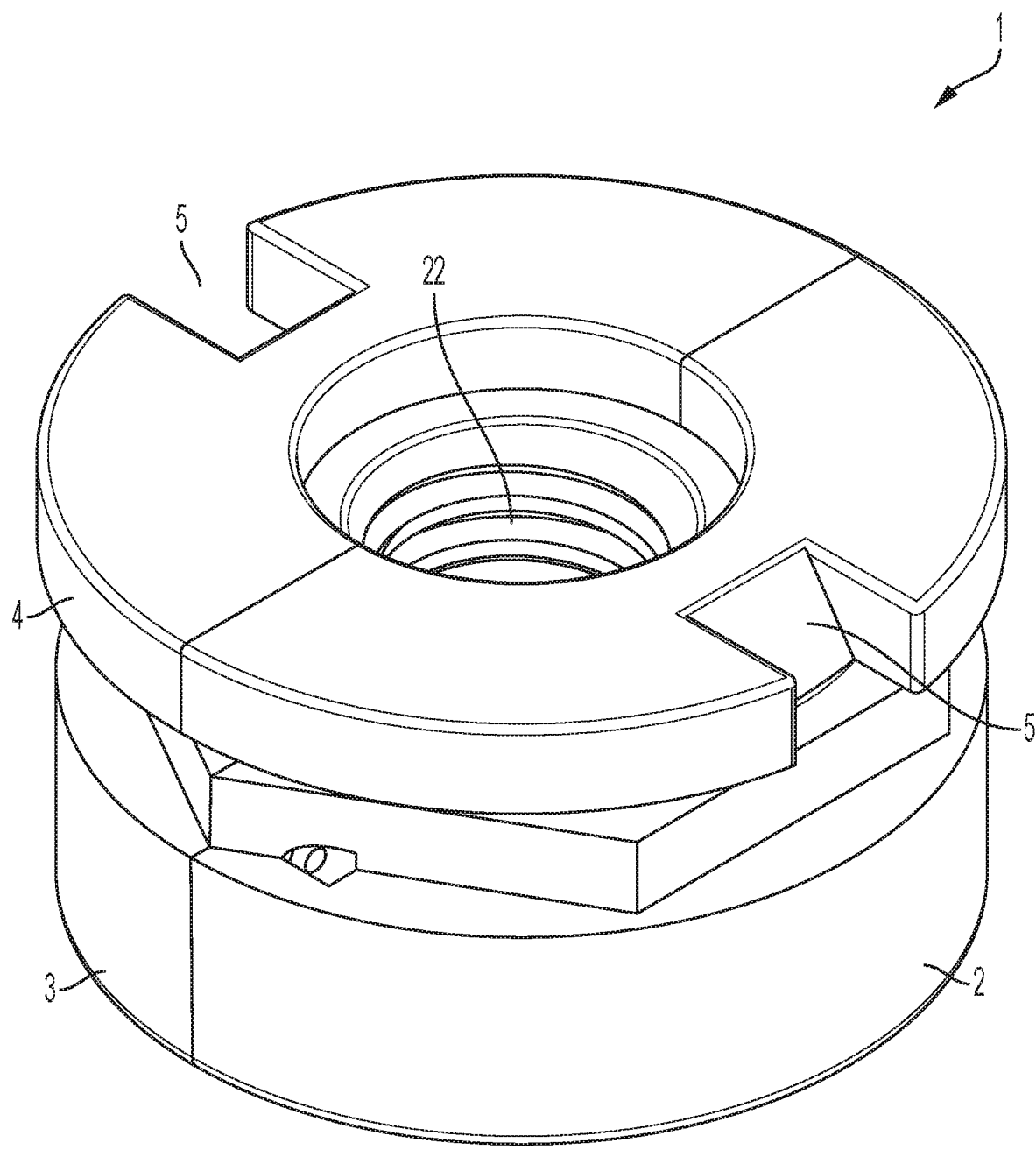
FIG. 1 is a perspective view of an embodiment of floating sandwich panel insert of the invention showing the halves joined around the nut.
Figure 2:
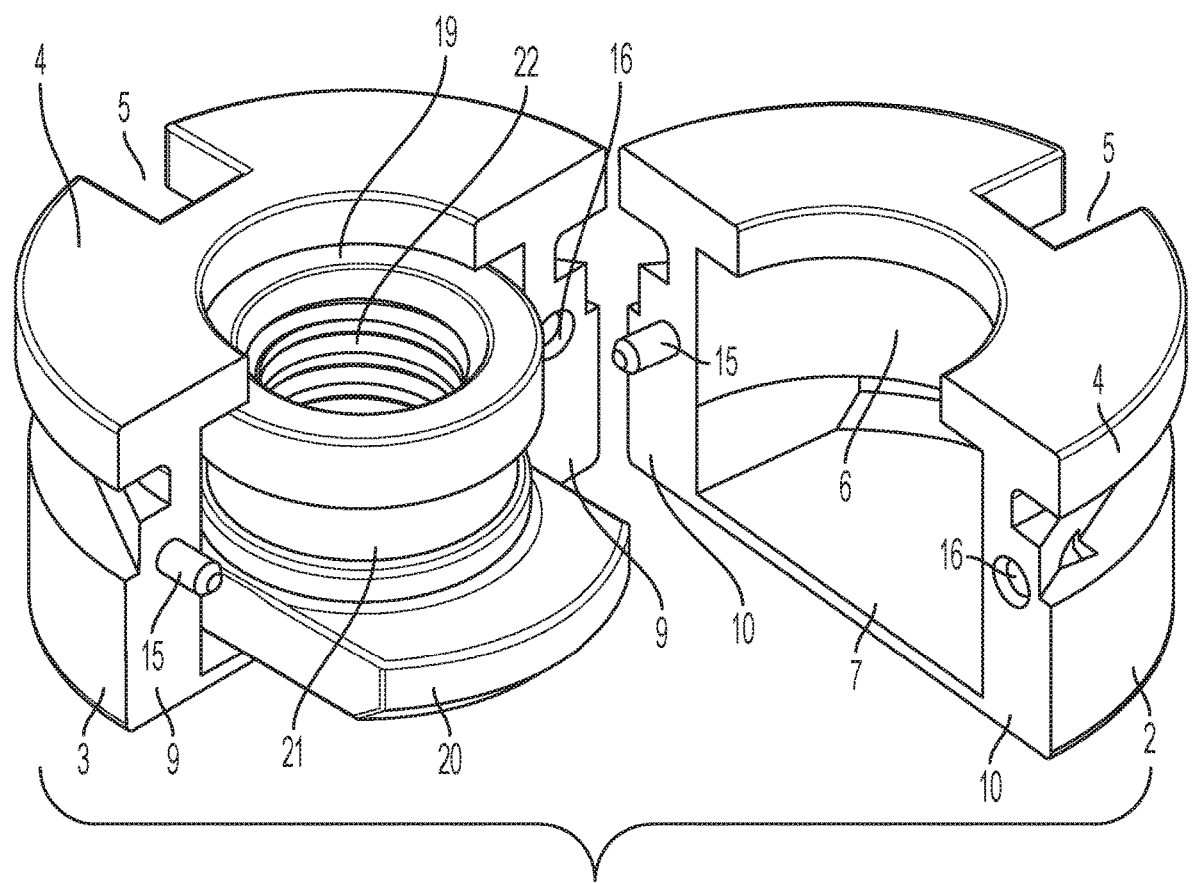
FIG. 2 is a perspective view of an embodiment of the floating sandwich panel insert of the invention having two halves and the nut in which each of the halves has on abutting surfaces one peg and one hole for receiving the peg.
Figure 3:
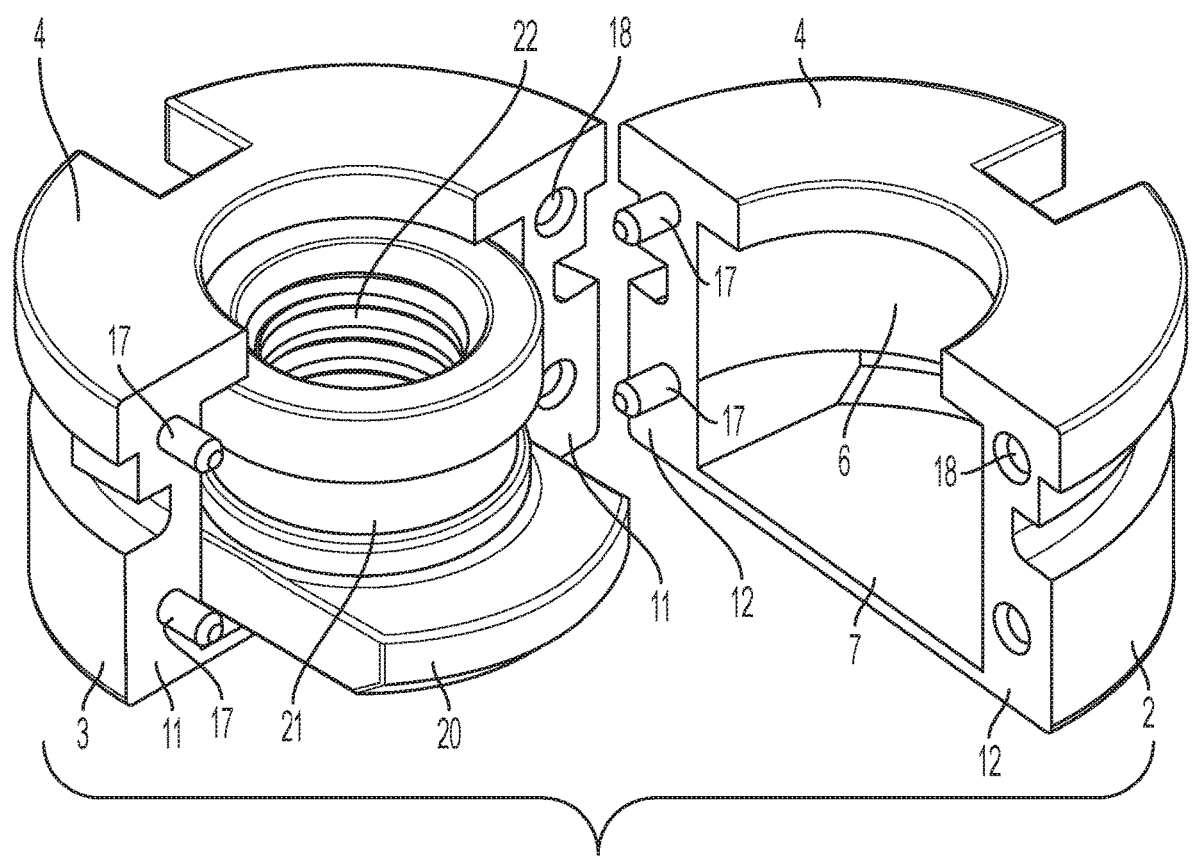
FIG. 3 is a perspective view of another embodiment of the sandwich panel insert of the invention having two halves and the nut in which each half has on abutting surfaces two pegs and two holes for receiving the pegs.
Figure 4:
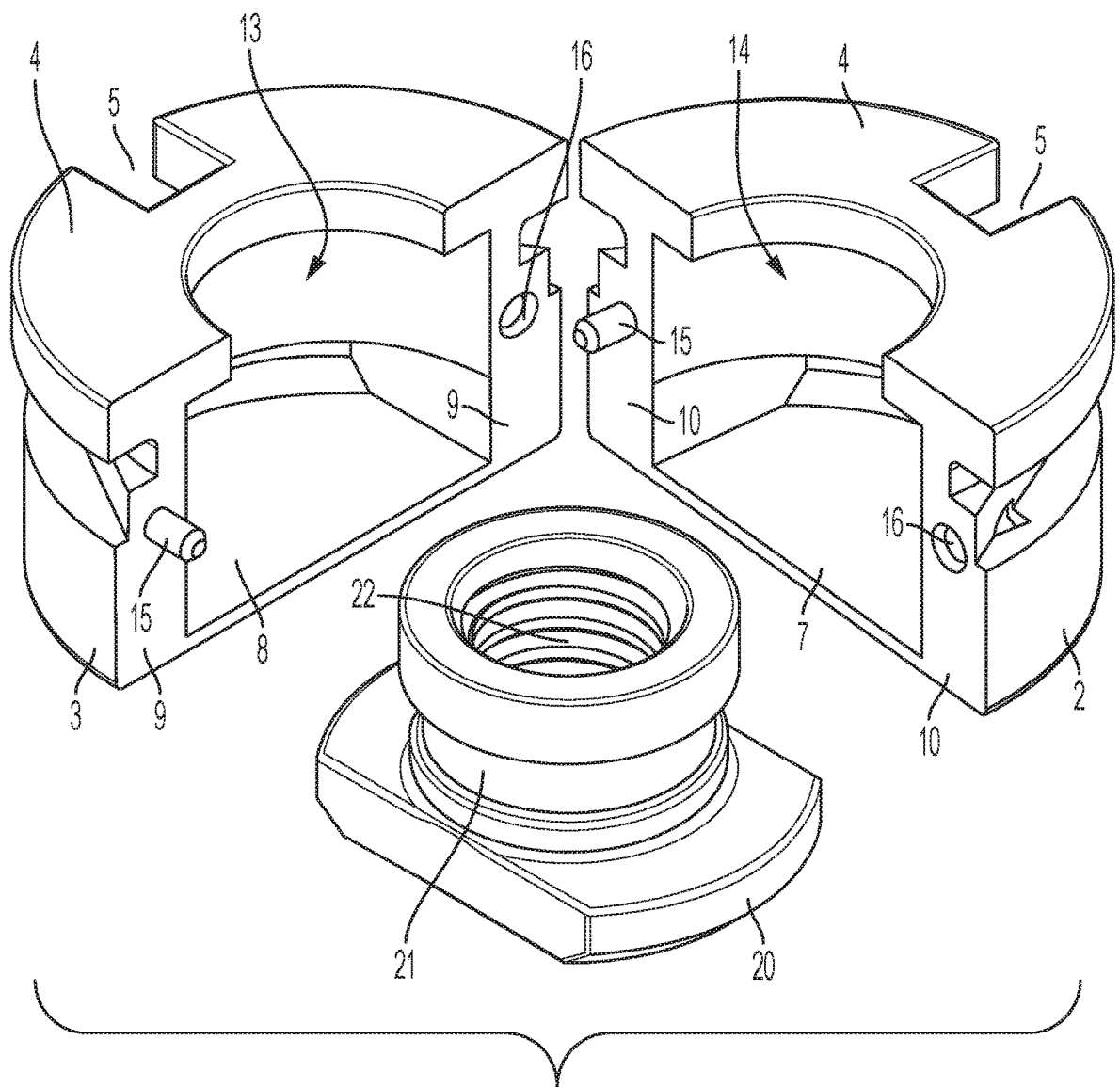
FIG. 4 shows the embodiment of the floating sandwich panel insert of FIG. 2 completely disassembled.
Figure 5:
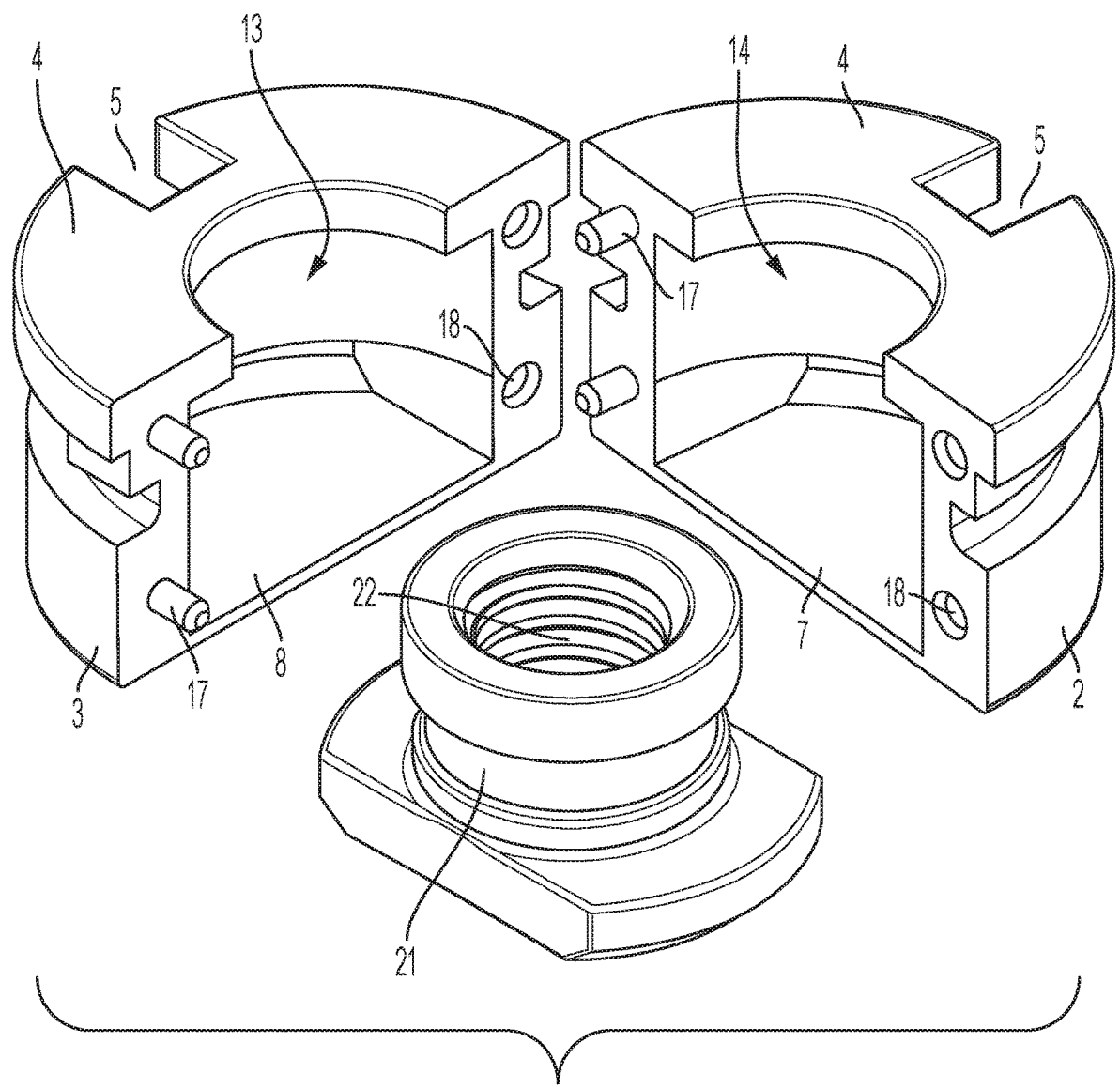
FIG. 5 shows the embodiment of the floating sandwich panel insert of FIG. 3 completely disassembled.

Turing to the drawings in more detail, the floating sandwich panel insert 1 of this invention includes a housing formed of two identical halves 2 and 3 which at the top or open end of the insert form an annular lateral distal flange 4 when the two halves are joined or closed on each other like a clamshell. The thus formed annular lateral distal flange is provided with slots or holes 5 for the introduction of potting material. Each of the halves 2 and 3 when joined forms a central internal bore 6. Each of the halves 2 and 3 has a laterally extending member 7 and 8 when joined forms a tight closed end of the bore 6. Members 7 and 8 are integrally formed with and are part of halves 2 and 3, respectively. Each of the halves 2 and 3 have abutting surfaces or faces 9 and 10 in the embodiment of FIGS. 2 and 4. Faces or abutting surfaces 11 and 12 are shown in the embodiment of FIGS. 3 and 5. The faces are at the side of the half bores 13 and 14. In the embodiment of FIGS. 2 and 4 each of the halves' faces has a single laterally projecting peg 15 and a single hole 16. In the embodiment of FIGS. 2 and 4, the faces abut when the halves 2 and 3 are joined by the engagement of the peg 15 on one of the halves with the hole 16 on the other half to form the closed insert housing.

In an alternate and preferred embodiment, there are two pegs 17 and two holes 18 on each of the faces as shown in FIGS. 3 and 5. The engagement of the pegs and holes on the faces to form the closed housing is as described above.

In either case, the faces provide abutting surfaces whereby when said halves are joined the peg or pegs are received in the hole or holes by a snap fit.

The honeycomb sandwich panel inserts of this invention include the two halves 2 and 3 that comprise the housing. Since the two halves 2 and 3 are identical, only one injection mold tooling die set is required to make each insert size. Prior embodiments that utilize a housing and a cap require two separate die sets.

Since the two halves 2 and 3 that comprise the housing are identical and are designed to press fit together, they can be easily assembled using automated equipment.

The inserts of this invention are stronger than prior inserts (in shear, tensile and/or torque testing), as the weakest member of prior inserts consisted of the cap. The present invention eliminates the cap element and allows the strength to be increased by designing the part to allow maximum material in the critical areas of the housing.

The two identical halves 2 and 3 of the clam shell-like housing are made of a thermoplastic polymeric material. Preferably, the abutting faces 9 with 10 and 11 with 12 are fused or welded to each other by the application of sonic energy which melts and fuses the polymeric material forming the housing.

The post-assembly welding operation can be automated. Energy directors can be added to half of the abutting surfaces or faces (resulting in the entire abutting surfaces having said energy directors when the two halves are pressed together) to aid in the effectivity of the sonic welding operation, and adding to the strength of the resultant insert assembly.

The nut 19 is received in bore 6 of the housing and configured to float therein, has a truncated flange 20 and a hollow shaft 21 extending from the truncated flange. The hollow shaft 21 has internal female threads 22 adapted to receive a male threaded screw. The truncated flange 20 is received at the closed distal end of bore 6 which prevents the rotation of the nut within the bore.

What is claimed:

1. A honeycomb sandwich panel insert comprising
a housing defined by two identical halves which, when joined together, form a distal flange having opposed potting holes, and a central internal bore,
integrally formed laterally extending member when joined forms a tight closed distal end of the bore,
a nut disposed within the internal bore of the housing and configured to float therein, the nut defining a truncated flange and a hollow shaft extending from the truncated flange, the hollow shaft defining internal female threads adapted to receive a male threaded screw, the truncated flange being received at the closed distal end of the bore to limit rotation of the nut in the bore, and the truncated flange being positioned between the closed distal end of the bore and the hollow shaft,
each of the halves having an abutting surface, at least one lateral peg projecting from the abutting surface and at least one hole in the abutting surface, the peg and the hole being positioned whereby when the halves are joined, a peg in one half is received in a hole in the other half.

2. The honeycomb sandwich panel insert of claim 1, wherein each of the halves has a single peg projecting from an abutting surface and one hole in an abutting surface.

3. The honeycomb sandwich panel insert of claim 1, wherein each of the halves has two lateral pegs projecting an abutting surface and two holes in abutting surface.

4. The honeycomb sandwich panel insert of claim 1, wherein each of the two halves has one peg and one hole and the abutting surfaces are joined and fused.

5. The honeycomb sandwich panel insert of claim 1, wherein each of the two halves has two pegs and two holes and the abutting surfaces are joined and fused.

6. An apparatus comprising:
a first housing portion of a housing, the first housing portion configured to mate with a second housing portion of the housing such that, when the first housing portion and the second housing portion are mated together:
the housing includes a top flange that defines opposing potting slots, an opening of the top flange is defined by the first housing portion and the second housing portion;
the housing defines a cavity having a bottom surface that is defined by the first housing portion and the second housing portion, the bottom surface opposite the opening; and
the cavity is configured to accommodate a nut including a shaft portion and a flange portion such that, when the nut is positioned in the cavity:
the flange of the nut is positioned between the shaft of the nut and the bottom surface; and
the cavity is configured to limit rotation of the nut based on the flange of the nut.

7. The apparatus of claim 6, wherein:
the shaft portion is positioned between:
a first curved side of the flange and a second curved side of the flange; and
a first planar side of the flange and a second planar side of the flange; and
the first planar side parallel with the second planar side.

8. The apparatus of claim 7, wherein, when the nut is positioned in the cavity, the first surface is positioned between an entirety of the first curved side and the second curved side.

9. The apparatus of claim 6, wherein the first housing portion includes a first surface configured to abut a second surface of the second housing portion.

10. The apparatus of claim 9, wherein the first surface includes a first surface portion and a second surface portion, and wherein, when the nut is positioned in the cavity, the nut is positioned between the first surface portion and the second surface portion.

11. The apparatus of claim 10, wherein the flange of the nut includes a first end portion that extends in a first direction from the shaft and a second end portion that extends in a second direction from the shaft, the first direction opposite the second direction.

12. The apparatus of claim 10, wherein the first housing portion includes a first protrusion that extends from the first surface and is configured to be received by a first hole included in the second surface of the second housing portion.

13. The apparatus of claim 12, wherein the first housing portion includes a second protrusion that extends from the first surface and is configured to be received by a second hole included in the second surface of the second housing portion.

14. The apparatus of claim 13, wherein the first protrusion and the second protrusion extend from the first surface portion.

15. The apparatus of claim 13, wherein the first surface of the first housing portion includes a third hole configured to receive a third protrusion that extends from the second surface of the second housing portion.

16. The apparatus of claim 15, wherein the first surface of the first housing portion includes a fourth hole configured to receive a fourth protrusion that extends from the second surface of the second housing portion.

17. The apparatus of claim 16, wherein the first protrusion and the second protrusion extend from the first surface portion, wherein the third hole and the fourth hole are defined in the second surface portion.

18. The apparatus of claim 6, further comprising the second housing portion.

19. The apparatus of claim 18, wherein the first housing portion and the second housing portion have the same structure.

20. The apparatus of claim 6, further comprising:
the nut,
wherein the shaft portion includes an internal threaded portion; and
wherein, when the nut is positioned in the cavity, the internal threaded portion is accessible via the opening.

* * * * *